US012782718B2

(12) United States Patent
Shobayashi et al.

(10) Patent No.: US 12,782,718 B2
(45) Date of Patent: Nov. 3, 2026

(54) OPTICAL SYSTEM AND IMAGE DISPLAY DEVICE

(71) Applicant: Panasonic Intellectual Property Management Co., Ltd., Osaka (JP)

(72) Inventors: Hiroyuki Shobayashi, Osaka (JP); Satoshi Kuzuhara, Osaka (JP); Kazuhiro Minami, Osaka (JP); Hiroaki Okayama, Nara (JP); Akira Hashiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 202 days.

(21) Appl. No.: 18/899,205

(22) Filed: Sep. 27, 2024

(65) Prior Publication Data

US 2025/0020917 A1 Jan. 16, 2025

Related U.S. Application Data

(63) Continuation of application No. PCT/JP2023/001013, filed on Jan. 16, 2023.

(30) Foreign Application Priority Data

Mar. 31, 2022 (JP) ................................ 2022-060600

(51) Int. Cl.
*G02B 27/01* (2006.01)
*F21V 8/00* (2006.01)
(Continued)

(52) U.S. Cl.
CPC ....... *G02B 27/0081* (2013.01); *G02B 6/0036* (2013.01); *G02B 6/0076* (2013.01); *G02B 27/0172* (2013.01); *G02B 27/0944* (2013.01)

(58) Field of Classification Search
CPC ........... G02B 27/0081; G02B 27/0172; G02B 27/0944; G02B 6/0036; G02B 6/0076; G02B 2027/0123; G02B 2027/0178
(Continued)

(56) References Cited

U.S. PATENT DOCUMENTS 10,429,645 B2 10/2019 Vallius
10,962,787 B1 * 3/2021 Lou ...................... G02B 6/0036
(Continued)

FOREIGN PATENT DOCUMENTS

JP 2018-54978 4/2018

OTHER PUBLICATIONS

International Search Report issued Feb. 21, 2023 in corresponding International Application No. PCT/JP2023/001013.
(Continued)

*Primary Examiner* — William R Alexander
(74) *Attorney, Agent, or Firm* — Wenderoth, Lind & Ponack, L.L.P.

(57) ABSTRACT

An optical system includes an incidence part changing a traveling direction of the incident image light from a display part and an expansion part that divides and duplicates the image light traveling from the incidence part. The expansion part includes a first and a second expansion part. The first expansion part includes a first and a second diffraction structure part each having a diffraction structure that divides and duplicates the image light along a first direction, and a non-diffraction structure part disposed between the first and the second diffraction structure part. The second expansion part includes a third diffraction structure part that divides and duplicates image light along the first direction. The third diffraction structure part is disposed to overlap with the non-diffraction structure part of the first expansion part in a vertical direction with respect to the pupil expansion part.

19 Claims, 14 Drawing Sheets

(51) Int. Cl.
*G02B 27/00* (2006.01)
*G02B 27/09* (2006.01)

(58) Field of Classification Search
USPC .......................................................... 359/630
See application file for complete search history.

(56) References Cited

U.S. PATENT DOCUMENTS 11,604,310 B2 * 3/2023 Schowengerdt ............................. B29D 11/00769
11,754,841 B2 * 9/2023 Bhargava ........... G02B 27/0172 345/630
11,822,112 B2 * 11/2023 Curtis .............. B29D 11/00769
2009/0097122 A1 4/2009 Niv
2015/0346490 A1 * 12/2015 Tekolste ............. G02B 27/0081 359/566
2017/0363871 A1 * 12/2017 Vallius ................. G02B 6/0016
2018/0095283 A1 4/2018 Takeda et al.
2018/0292653 A1 10/2018 Tervo
2019/0137777 A1 5/2019 Yang et al.
2020/0015923 A1 1/2020 Scheib et al.
2020/0033609 A1 * 1/2020 Luo ...................... G02B 6/0036
2020/0048143 A1 * 2/2020 Melli ................. G02B 27/4205
2020/0159023 A1 * 5/2020 Bhargava ........... G02B 27/0172
2020/0284967 A1 * 9/2020 Schowengerdt ............................. B29D 11/00769
2021/0055551 A1 * 2/2021 Chi .................... G02B 27/0172
2021/0239982 A1 * 8/2021 Valera ...................... G02B 5/18
2022/0099990 A1 * 3/2022 Olkkonen .......... G02B 27/0172
2022/0381969 A1 * 12/2022 Curtis .............. B29D 11/00769
2025/0020933 A1 * 1/2025 Kuzuhara .......... G02B 27/0081

OTHER PUBLICATIONS

Extended European Search Report issued Jun. 12, 2025 in European Patent Application No. 23778740.3.
International Preliminary Report on Patentability issued Sep. 24, 2024 in International (PCT) Application No. PCT/JP2023/001013.

* cited by examiner

OPTICAL SYSTEM AND IMAGE DISPLAY DEVICE

CROSS-REFERENCE TO RELATED APPLICATIONS

This is a continuation application of International Application No. PCT/JP2023/001013, with an international filing date of Jan. 16, 2023, which claims priority of Japanese Patent Application No. 2022-060600 filed on Mar. 31, 2022, the content of which is incorporated herein by reference.

BACKGROUND

Technical Field

The present disclosure relates to an optical system used for displaying an image and an image display device including the same.

Background Art

As a device for displaying an image, U.S. Pat. No. 10,429,645 describes an optical system including a waveguide (light guide) for expanding an exit pupil in two directions. The optical system can expand the exit pupil by using a diffractive optical element. U.S. Patent Application Pub. No. 2009/0097122 describes a head-mounted display that keeps the amount of light diffracted from a diffraction grating constant by modulating the height or duty ratio of the diffraction grating.

SUMMARY

In order to achieve a field-of-view region with a wide angle of view, it is required to increase the area of the expansion part that expands the exit pupil. The expansion part, however, has a highly accurate diffraction structure part, making it difficult to increase the area of the expansion part in terms of manufacturing. In the case where a plurality of expansion parts are joined together to increase the area of the expansion part, discontinuity in the diffraction structure part at the joints may affect the displayed image as distortion.

The present disclosure provides an optical system and an image display device with enlarged expansion part area and reduced image distortion.

An optical system of the present disclosure includes: an incidence part on which image light is incident from a display part and which changes a traveling direction of the incident image light; and a pupil expansion part that divides and duplicates the image light traveling from the incidence part. The pupil expansion part includes: a first expansion part disposed on a first surface; and a second expansion part disposed on a second surface different from the first surface. The first expansion part includes: a first diffraction structure part and a second diffraction structure part each having a diffraction structure that divides and duplicates the image light along a first direction; and a non-diffraction structure part disposed between the first diffraction structure part and the second diffraction structure part, the non-diffraction structure part not having the diffraction structure. The second expansion part includes a third diffraction structure part that divides and duplicates image light along the first direction. The third diffraction structure part is disposed overlapping with the non-diffraction structure part of the first expansion part in a vertical direction with respect to the pupil expansion part.

An image display device of the present disclosure includes the above-described optical system and a display part that emits image light.

According to the optical system and the image display device of the present disclosure, an optical system and an image display device with enlarged expansion part area and reduced image distortion can be provided.

DETAILED DESCRIPTION

First Embodiment

[1-1. Configuration]

[1-1-1. Overall Configuration of Optical System]

Figure 1:
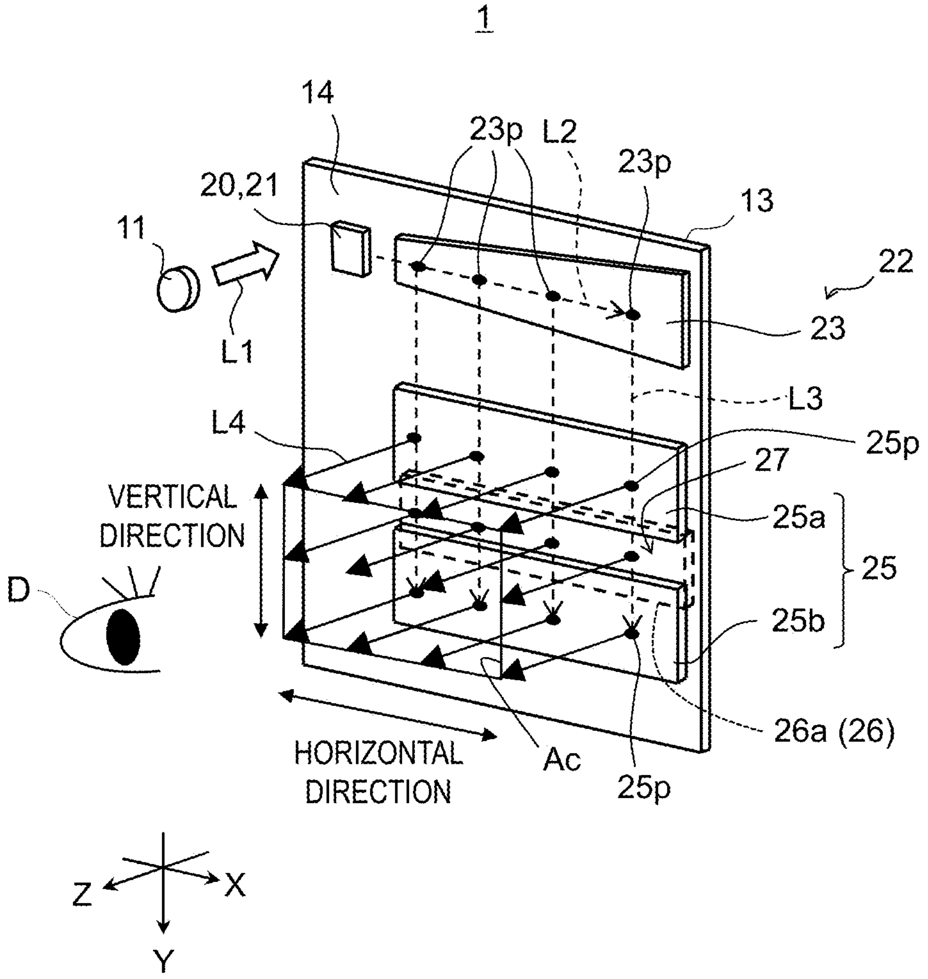
FIG. 1 is a schematic perspective view showing the configuration of an optical system of a first embodiment.
Figure 2:
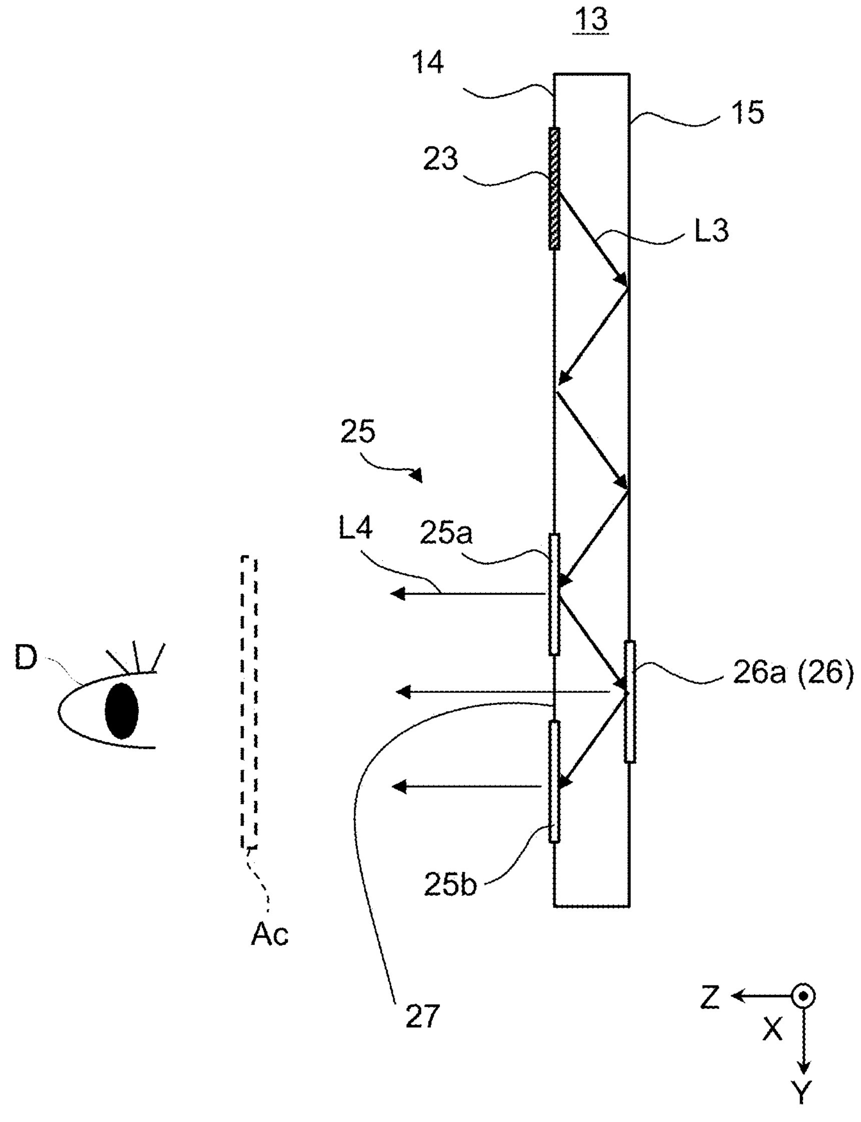
FIG. 2 is a longitudinal cross-sectional view of a light guide of the first embodiment.
Figure 3:
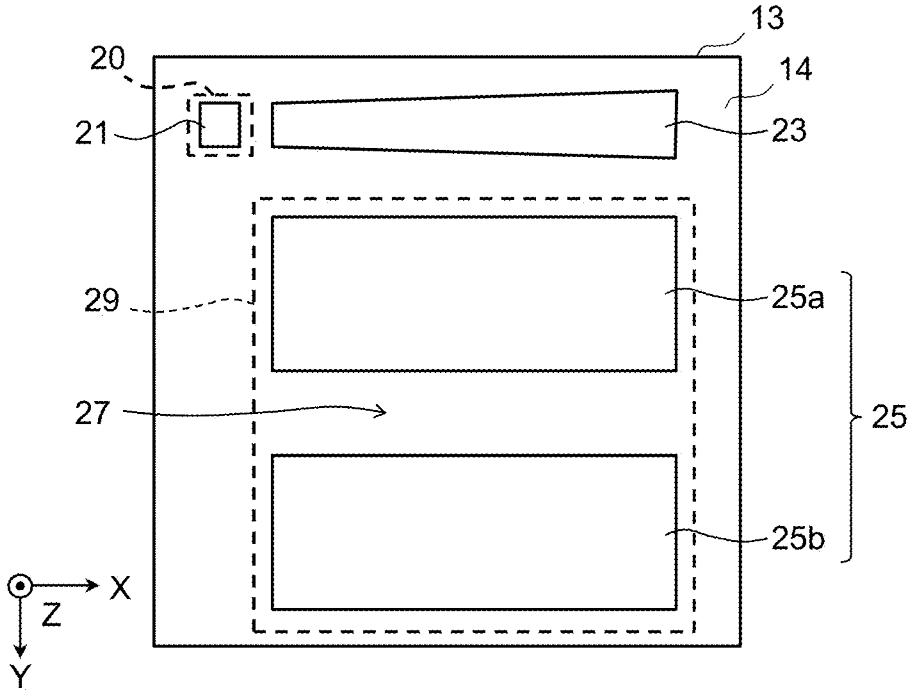
FIG. 3 is a front view of a first main surface of the light guide of the first embodiment.
Figure 4:
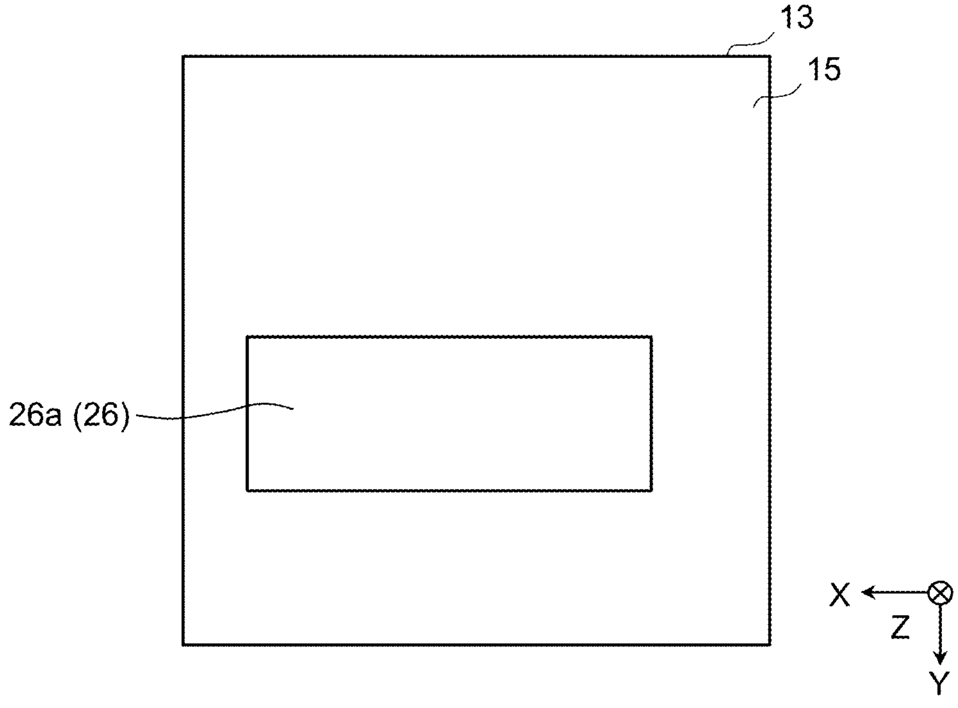
FIG. 4 is a front view of a second main surface of the light guide of the first embodiment.

A specific embodiment of an image display device 1 of the present disclosure will be described with reference to FIGS. 1 to 4. FIG. 1 is a schematic perspective view showing the configuration of the image display device 1. FIG. 2 is a longitudinal cross-sectional view of a light guide of a first embodiment. FIG. 3 is a front view of a first main surface of the light guide of the first embodiment. FIG. 4 is a front view of a second main surface of the light guide of the first embodiment. In the first embodiment, a first direction corresponds to the vertical direction of a field-of-view region Ac, and a second direction corresponds to the horizontal direction of the field-of-view region Ac in which an image can be visually recognized.

The image display device 1 is used in an electronic mirror, a head-up display system (hereinafter referred to as an HUD system), a head-mounted display (hereinafter referred to as an HMD), etc. The image display device 1 includes a display part 11 and a so-called pupil-expanding light guide 13. The image display device 1 may include a projection optical system between the display part 11 and the light guide 13, which collimates a luminous flux L1 of image light from the display part 11 and causes the luminous flux L1 to enter a coupling part 21. The projection optical system 7 is, for example, a biconvex lens.

The display part 11 displays an image based on the control by an external controller. For example, a backlit liquid crystal display (LCD), an organic light-emitting diode (OLED) display, a plasma display, or the like can be used as the display part 11. The display part 11 may generate an image using a screen that diffuses or reflects light and a projector or a scanning laser. The display part 11 can display image content containing various types of information and emits a luminous flux L1 containing image content that is visually recognized as an image by an observer D.

The light guide 13 divides and duplicates the luminous flux L1 emitted from the display part 11, and guides a duplicated luminous flux L4 to the field-of-view region Ac. The light guide 13 includes the coupling part 21 that receives image light from the display part 11 to change the traveling direction thereof and a pupil expansion part 22 that divides and duplicates incident image light. The pupil expansion part 22 includes a third expansion part 23 that expands an entrance pupil in a second direction (X-axis direction), and a first expansion part 25 and a second expansion part 26 that expand the entrance pupil in a first direction (Y-axis direction). The first direction and the second direction intersect with each other, and may be orthogonal to each other, for example.

[1-1-2. Configuration of Light Guide]

The coupling part 21, the third expansion part 23, the first expansion part 25, and the second expansion part 26 each have a diffraction power for diffracting the image light and each have, for example, an embossed hologram as a diffraction grating. The coupling part 21, the third expansion part 23, and the first expansion part 25 each have a different diffraction angle of image light.

The diffraction structure disposed in the coupling part 21 is, for example, a transmissive surface relief type diffraction grating, in which the unevenness is formed periodically but may not be formed completely periodically. The coupling part 21 changes the propagation direction of image light incident from the outside toward the third expansion part 23 by the diffraction power and emits it as a luminous flux L2. In the first embodiment, the coupling refers to a state in which the light propagates through the interior of the light guide 13 under a total reflection condition.

The light guide 13 is configured to totally reflect the incident luminous flux inside. The light guide 13 has an incidence part 20 on which the luminous flux of the image light from the display part 11 is incident and an emission part 29 from which the luminous flux divided and duplicated within the light guide 13 is emitted. The light guide 13 has a first main surface 14 and a second main surface 15 facing each other, and in the first embodiment, as shown in FIG. 3, the incidence part 20, the third expansion part 23, the first expansion part 25, and the emission part 29 are arranged on the first main surface 14 that is the front surface, with the coupling part 21 disposed on the incidence part 20. The first main surface 14 and the second main surface 15 are parallel. As shown in FIG. 4, the second expansion part 26 are arranged on the second main surface 15 that is the back surface.

The first main surface 14 also faces the viewer D. In the first embodiment, the coupling part 21 is included in the incidence part 20, but the coupling part 21 may be disposed on the second main surface 15 separately from the incidence part 20. The emission part 29 may also be disposed on the second main surface 15 separate from the first main surface 14 on which the incidence part 20 is disposed. In this case, the viewer D faces the second main surface opposite to the first main surface on which the light is incident.

Reference is made to FIG. 1. The third expansion part 23 is arranged with, for example, transmissive relief-type diffraction gratings so as to duplicate the image light by dividing the incident image light into image light traveling in the second direction (X-axis direction) and image light traveling in the first direction (Y-axis direction), i.e., to the first expansion part 25, by diffraction power. The third expansion part 23 expands the luminous flux L2 in the second direction corresponding to the horizontal direction of the field-of-view region Ac and emits it to the first expansion part 25 lying in the first direction (Y-axis direction) intersecting with the second direction. The third expansion part 23 functions as a bending part that bends the luminous flux L2 in the direction of the area from which the image light is extracted.

For example, in FIG. 1, in the third expansion part 23, the diffraction gratings are arranged at four points 23*p* aligned in the direction where the image light travels while repeating total reflection. The diffraction gratings divide the image light at each point 23*p* to allow the divided image light to travel to the first expansion part 25. The incident image luminous flux is expanded by being duplicated into four image luminous fluxes in the second direction. In this way, the luminous flux L2 propagated from the coupling part 21 propagates in the second direction while repeating total reflection at the first main surface 14 and the second main surface 15 and is duplicated by the diffraction structure of the third expansion part 23 formed on both the first main surface 14 and the second main surface 15, for emission in the first direction. The first expansion part 25 and the second expansion part 26 are arranged in the first direction with respect to the third expansion part 23 so that the image light divided and duplicated in the first direction from the third expansion part 23 is guided to the first expansion part 25 and the second expansion part 26 by the first main surface 14 and the second main surface 15.

The first expansion part 25 has a first diffraction structure part 25*a* and a second diffraction structure part 25*b*. The first expansion part 25 duplicates the image light by dividing the incident image light into image light propagating in the first direction (Y-axis direction) and image light emitted from the first expansion part 25 to the outside, by the diffraction power. The first diffraction structure part 25*a* and the second diffraction structure part 25*b* are, for example, relief-type diffraction gratings, in which the unevenness is formed periodically but may not be formed completely periodically. A non-diffraction structure part 27 is disposed between the first diffraction structure part 25*a* and the second diffraction structure part 25*b*. The non-diffraction structure part 27 is mainly along the shape of the light guide 13 and is a region where transmission, refraction, and total reflection, rather than diffracting action, mainly occur for the luminous flux propagating inside the light guide 13.

The second expansion part 26 has a third diffraction structure part 26*a* to duplicate the image light by dividing the incident image light into image light traveling in the first direction (Y-axis direction) and image light passing through the non-diffraction structure part 27 from the second expansion part 26 to the outside for emission, by the diffractive power. The third diffraction structure part 26*a* is, for example, a reflective relief-type diffraction grating in which the unevenness is formed periodically but may not be formed completely periodically. A luminous flux L3 guided in the Y-axis direction from the third expansion part 23 repeats total reflection at the first main surface 14 and the second main surface 15 while propagating in the first direction, to be duplicated by the diffraction structures of the first expansion part 25 arranged on the first main surface 14 and the second expansion part 26 arranged on the second main surface 15, for emission to the outside of the light guide 13 via the emission part 29.

In FIG. 1, for example, the first expansion part 25 and the second expansion part 26 allow three division and duplicate points 25*p* per row, i.e., a total of 12 points 25*p* in four rows to be arrayed in the first direction in the light guide 13. The image light is divided at each of the points 25*p* and the divided image light is emitted to the outside. As a result, the four rows of incident image luminous fluxes are each duplicated into three image luminous fluxes in the first direction, for expansion. In this way, the light guide 13 can duplicate twelve image luminous fluxes (pupils) from one incident image luminous flux and duplicate the luminous flux in the first and second directions to expand the field of view.

Therefore, from the viewpoint of the observer D, the light guide 13 expands the luminous flux L1, whose direction of travel has been changed by entering the incidence part 20, in the horizontal direction of the image visually recognized by the observer D, and then further expands it in the vertical direction of the image to emit the luminous flux L4 from the emission part 29. Here, duplicating the image in the horizontal direction is not limited to duplicating in the completely horizontal direction, but also includes duplicating in the substantially horizontal direction. Duplicating the image in the vertical direction is not limited to duplicating in the completely vertical direction, but also includes duplicating in the approximately vertical direction. The observer can visually recognize each of the twelve image luminous fluxes as an image so that the field-of-view region Ac in which the observer D can visually recognize the image light can be widened.

[1-1-3. First Expansion Part and Second Expansion Part]

By combining the first diffraction structure part 25*a*, the second diffraction structure part 25*b*, and the third diffraction structure part 26*a*, which are smaller than the area of the emission part 29, a field-of-view region Ac with a large area can be implemented without requiring an apparatus for producing large-area diffraction structure parts.

In the first direction, the non-diffraction structure part 27 is disposed between the first diffraction structure part 25*a* and the second diffraction structure part 25*b*. From a viewpoint directly facing the luminous flux L4 emitted from the emission part 29, the non-diffraction structure part 27 is disposed overlapping with the third diffraction structure part 26*a*, with a lower portion of the first diffraction structure part 25*a* overlapping with an upper portion of the third diffraction structure part 26*a*, and an upper portion of the second diffraction structure part 25*b* overlapping with a lower portion of the third diffraction structure part 26*a*.

Figure 5:
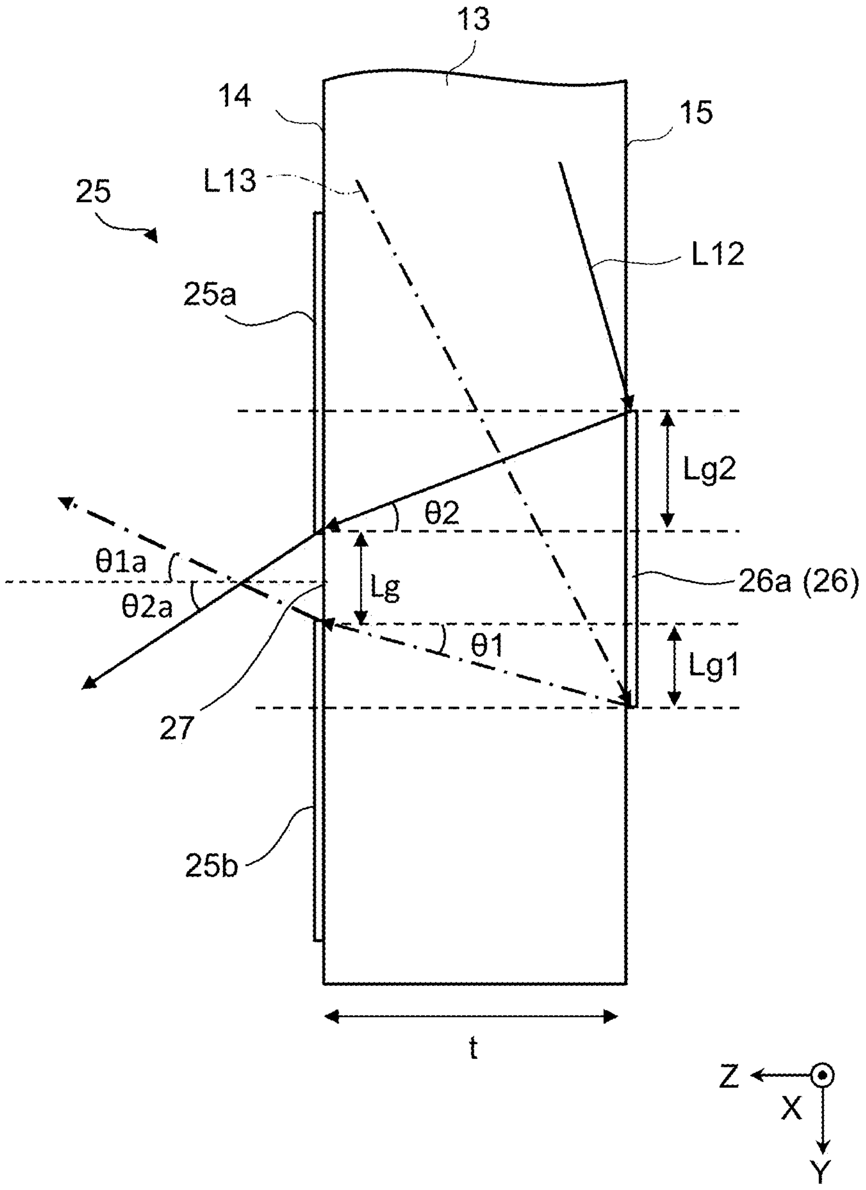
FIG. 5 is an explanatory view for explaining an optical path of diffracted light from a third diffraction structure part of the first embodiment.

Referring then to FIG. 5, a length Lg of the non-diffraction structure part 27 in the first direction will be described. When the first diffraction structure part 25*a*, the second diffraction structure part 25*b*, and the third diffraction structure part 26*a* are arranged along the first direction, if the length Lg of the non-diffraction structure part 27 is short, the luminous flux L3 propagating in the first direction may be diffracted at the lower end of the first diffraction structure part 25*a* and the upper end of the second diffraction structure part 25*b*, causing interference and resulting in a deterioration in image quality.

When the relationship between the length Lg of the non-diffraction structure part 27, a wavelength λ of the luminous flux L1 emitted from the display part 11, and a wavelength width Δλ of the luminous flux L1 satisfies Formula (1) below, the length Lg of the non-diffraction structure part 27 becomes larger than the coherence length, leading to reduced interference.

$$(\lambda\times\lambda/\Delta\lambda)-Lg>0 \qquad \text{Formula (1)}$$

For example, if the length Lg of the non-diffraction structure part 27 is 10 times or more the wavelength of the luminous flux L1, degradation of the image quality can be prevented. The length Lg of the non-diffraction structure part 27 is, for example, 5 to 20 μm or more.

The relationship between a length Lg1 of overlap between the second diffraction structure part 25*b* and the third diffraction structure part 26*a* in the first direction, a thickness t of the light guide 13 orthogonal to the first direction, and an incidence angle θ1 of the luminous flux reflected at the lower end of the third diffraction structure part 26*a* to the upper end of the second diffraction structure part 25*b* satisfies Formula (2) below. This prevents the pupil of a secondary light ray L13 with a minimum propagation angle, which is the minimum angle of incidence (propagation angle) of the luminous flux L1 to the incidence part 20, from being missing.

$$Lg1>t\times\tan\theta1 \qquad \text{Formula (2)}$$

The relationship between a length Lg2 of overlap between the first diffraction structure part 25*a* and the third diffraction structure part 26*a* in the first direction, the thickness t of the light guide 13, and an incidence angle θ2 of the luminous flux reflected at the upper end of the third diffraction structure part 26*a* to the lower end of the first diffraction structure part 25*a* satisfies Formula (3). This prevents the pupil of a secondary light ray L12 with a maximum propagation angle, which is the maximum angle of incidence (propagation angle) of the luminous flux L1 to the incidence part 20, from being missing.

$$Lg2>t\times\tan\theta2 \qquad \text{Formula (3)}$$

The angle between an angle θ1*a* at which the secondary light ray L13 propagating in the light guide 13 at the minimum propagation angle is visible and an angle θ2*a* at which the secondary light ray L12 propagating in the light guide 13 at the maximum propagation angle is visible is the angular range where the extracted image light can be visually recognized even if the user's viewpoint shifts.

[1-1-4. Diffraction Structure Part]

Referring then to FIG. 6A-6D, the diffraction structure parts of the first expansion part 25 and the second expansion part 26 will be described. FIGS. 6A to 6D are explanatory views showing the configuration of each diffraction structure part.

Figure 6A:
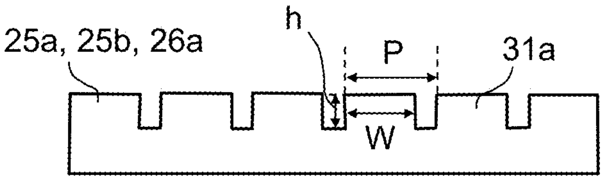
FIG. 6A-6D are explanatory views showing the configuration of each diffraction structure part of the first embodiment.

The first diffraction structure part 25*a*, the second diffraction structure part 25*b*, and the third diffraction structure part 26*a* each have a structure of a diffraction grating 31*a* that is periodically formed at a pitch P. As shown in FIG. 6A, the diffraction grating 31*a* has structural characteristics determined by a height h from the surface, a width W, a pitch P, and a duty ratio Dr (Dr=W/P). The diffraction grating 31*a* is, for example, a transparent resin layer and is formed by nanoimprinting. Instead of nanoimprinting, the diffraction grating 31*a* may be formed, for example, by layering $SiO_2$ on a glass substrate and dry etching.

Figure 6B:
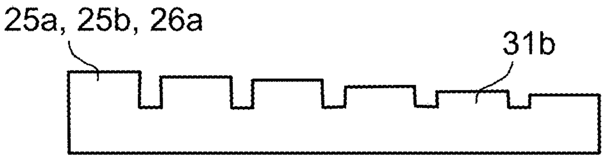

The first diffraction structure part 25*a*, the second diffraction structure part 25*b*, and the third diffraction structure part 26*a* may have gradually modulated heights of convex portions formed periodically with the pitch P. As shown in FIG. 6B, the heights of the convex portions of diffraction gratings 31*b* may gradually decrease or gradually increase.

Figure 6C:
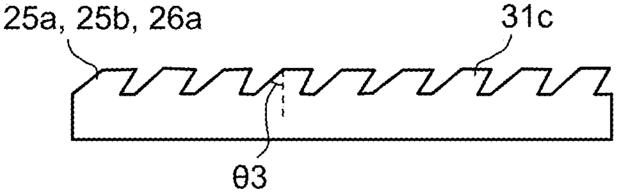

As shown in FIG. 6C, diffraction gratings 31*c* of the first diffraction structure part 25*a*, the second diffraction structure part 25*b*, and the third diffraction structure part 26*a* may have a slant angle θ3.

Figure 6D:
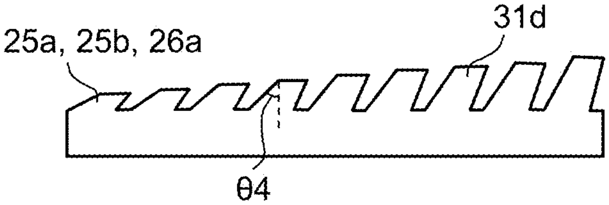

The slant angles of the diffraction grating of the first diffraction structure part 25*a*, the second diffraction structure part 25*b*, and the third diffraction structure part 26*a* may be gradually modulated. As shown in FIG. 6D, the slant angles may be gradually decreased or gradually increased from a leftmost diffraction grating 31*d* to a rightmost diffraction grating 31*d* in the figure.

At least one set of the plurality of diffraction structures may have different slant angles. For example, the slant angle of the first diffraction structure part 25*a* may be larger than the slant angle of the second diffraction structure part 25*b*. The slant angles of the first diffraction structure part 25*a* and the second diffraction structure part 25*b* may be different from the slant angle of the third diffraction structure part 26*a* and may be shaped such that the directions in which the propagation light enters are different and that the directions in which the image light exits are the same.

Figure 7:
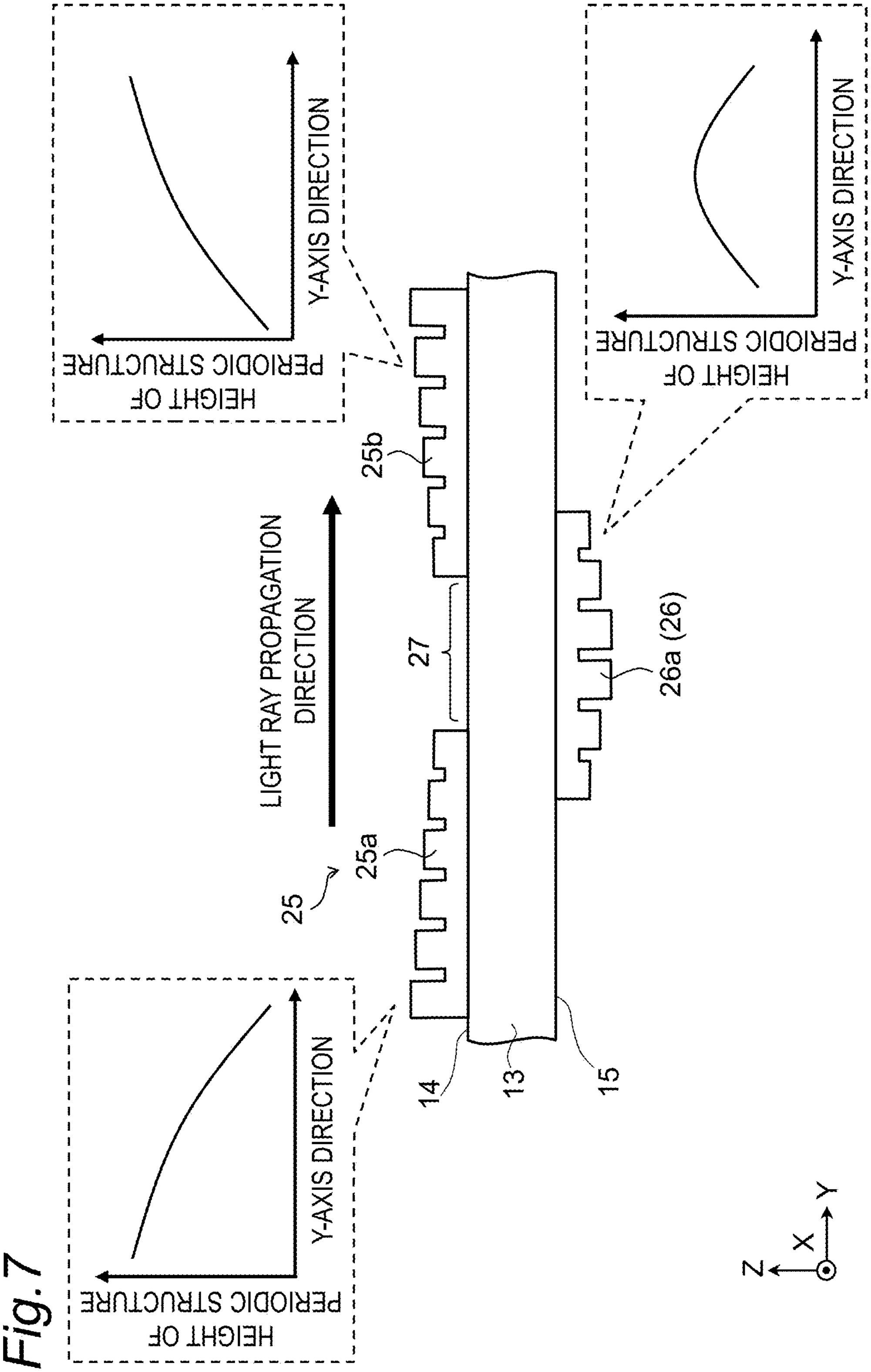
FIG. 7 is a longitudinal cross-sectional view showing modulation of the diffraction structure of each diffraction structure part.

At least a part of the first diffraction structure part 25*a* and the second diffraction structure part 25*b* constituting the second expansion part may have a diffraction efficiency that decreases toward the non-diffraction structure part 27. The lower the height of the diffraction grating, the lower the diffraction efficiency. This configuration will be described with reference to FIG. 7. FIG. 7 is an explanatory view for explaining the modulation of the height of each diffraction structure part.

The diffraction efficiency of the first diffraction structure part 25*a* is decreased along the first direction toward the non-diffraction structure part 27. To achieve this, for example, the height of the diffraction structure, i.e., a height h of the diffraction grating is decreased according as it proceeds in the first direction (Y-axis direction). The diffraction efficiency of the third diffraction structure part 26*a* is gradually increased and then gradually decreased along the first direction from the first diffraction structure part 25*a* toward the second diffraction structure part 25*b*. To achieve this, for example, the height of the diffraction structure, i.e., the height h of the diffraction grating is decreased according as it proceeds in the first direction (Y-axis direction). The diffraction efficiency of the second diffraction structure part 25*b* is decreased along the negative direction of the first direction toward the non-diffraction structure part 27. To achieve this, for example, the height of the diffraction structure, i.e., the height h of the diffraction grating is decreased according as it proceeds in the negative direction of the first direction.

Figure 8A:
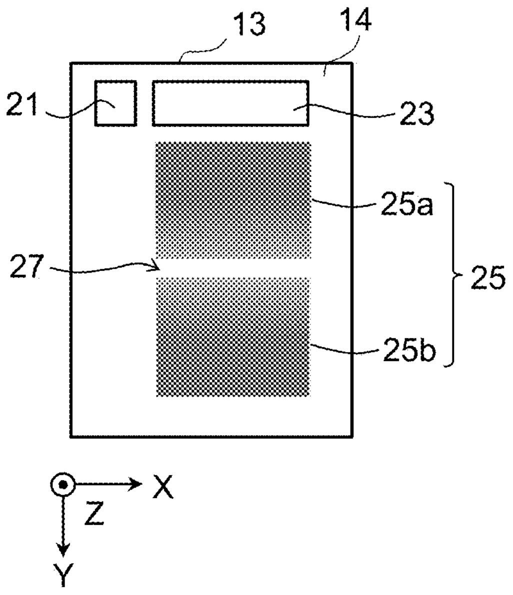
FIG. 8A-8C are explanatory views showing the relationship between the diffraction efficiency of each diffraction structure and an image.
Figure 8B:
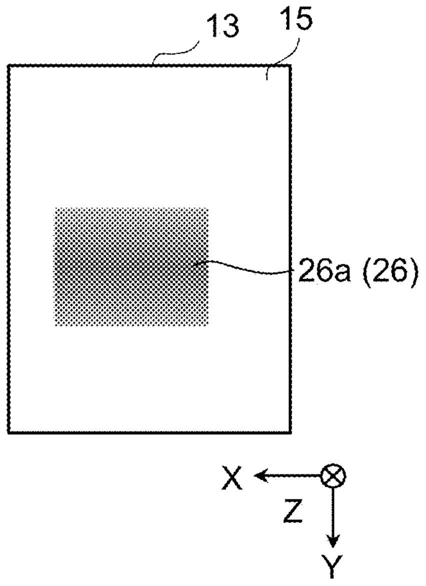
Figure 8C:
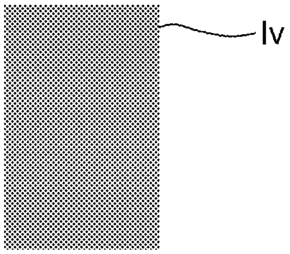

FIG. 8A-8C are explanatory views showing the relationship between the diffraction efficiency of the diffraction structure and an image. FIG. 8A shows the diffraction efficiency of the first expansion part 25, FIG. 8B shows the diffraction efficiency of the second expansion part 26, and FIG. 8C shows an image visually recognized by the observer. In the first expansion part 25 and the second expansion part 26 in FIGS. 8A and 8B, dark-colored portions indicate areas with high diffraction efficiency, while light-colored portions indicate areas with low diffraction efficiency.

As shown in FIG. 7, the first expansion part 25 and the second expansion part 26 each have a lower diffraction efficiency at areas where they overlap as seen from the observer, that is, the overlapping area between the first diffraction structure part 25*a* and the third diffraction structure part 26*a* and the overlapping area between the second diffraction structure part 25*b* and the third diffraction structure part 26*a*. This reduces the occurrence of the difference in the amount of light between the luminous flux L4 diffracted and emitted from the overlapping areas and the luminous flux L4 diffracted and emitted from areas other than the overlapping areas. As a result, the generation of color irregularities in an image Iv can be reduced as shown in FIG. 8C.

Figure 9A:
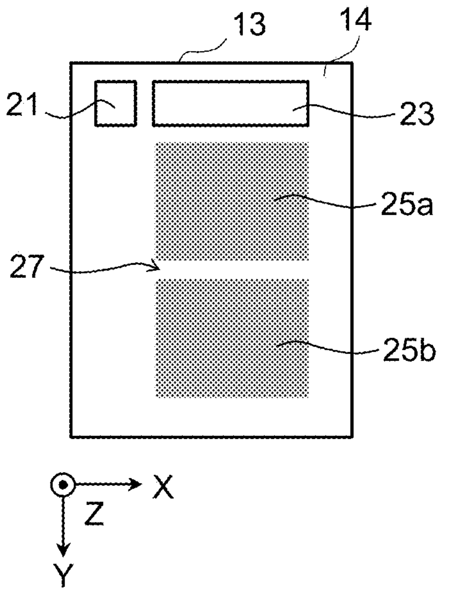
FIG. 9A-9C are explanatory views showing the relationship between the diffraction efficiency of each diffraction structure and an image.
Figure 9B:
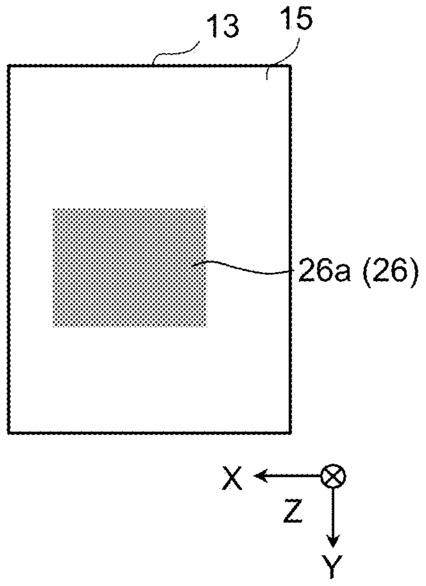
Figure 9C:
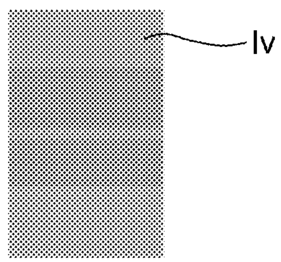

On the other hand, as shown in FIGS. 9A and 9B, in the case where the first expansion part 25 and the second expansion part 26 include diffraction gratings 31*a* with a uniform diffraction efficiency as shown in FIG. 6A, a difference in the amount of light occurs between the luminous flux L4 diffracted and emitted from the overlapping areas and the luminous flux L4 diffracted and emitted from areas other than the overlapping areas. This may cause color irregularities in the image Iv as shown in FIG. 9C. However, even in this case, distortion, blurring, etc., of the image can be reduced.

Figure 10:
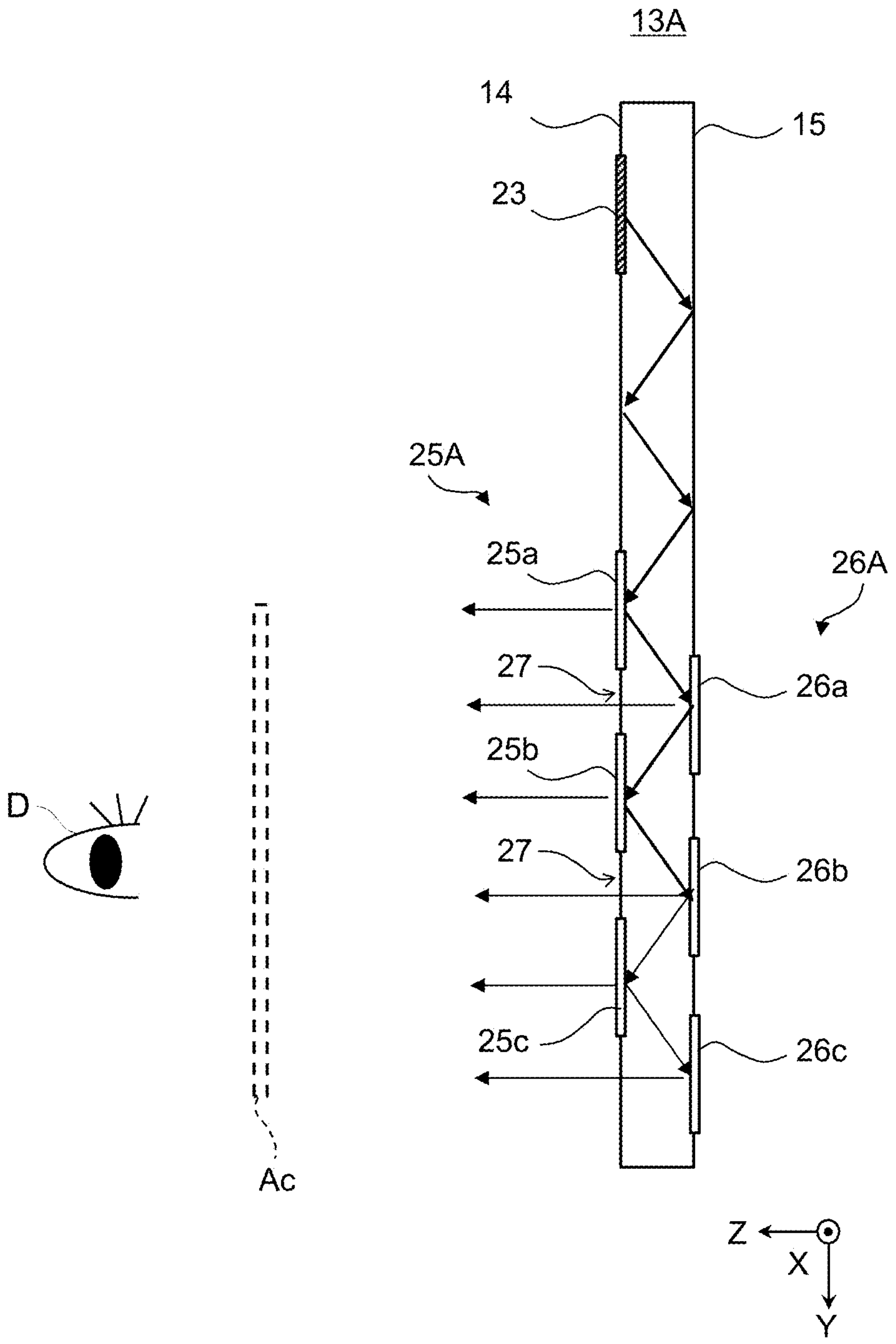
FIG. 10 is a longitudinal cross-sectional view of a light guide in a variant of the first embodiment.

Referring then to FIG. 10, a variant of the first embodiment will be described. FIG. 10 is a longitudinal cross-sectional view of a light guide in the variant of the first embodiment. In the variant of the first embodiment, a first expansion part 25A has three or more diffraction structure parts, while a second expansion part 26A has two or more diffraction structure parts. This allows the field-of-view region Ac to be enlarged.

[1-2. Effects, Etc.]

The light guide 13 as the optical system of the present disclosure has the incident part 20 that changes the traveling direction of the incident luminous flux L1 of the image light from the display part 11, and the expansion part that divides and duplicates the image light traveling from the incident part 20. The expansion part has the first expansion part 25 disposed on the first main surface 14, and the second expansion part 26 disposed on the second main surface 15 different from the first main surface 14. The first expansion part 25 has the first diffraction structure part 25*a* and the second diffraction structure part 25*b* that divide and duplicate the image light along the first direction, and the non-diffraction structure part 27 disposed between the first diffraction structure part 25*a* and the second diffraction structure part 25*b*. The second expansion part 26 has the third diffraction structure part 26*a* that divides and duplicates the image light along the first direction. The third diffraction structure part 26*a* is arranged overlapping with the non-diffraction structure part 27 of the first expansion part 25 from the viewpoint of the user.

Since the non-diffraction structure part 27 disposed between the first diffraction structure part 25*a* and the second diffraction structure part 25*b* is arranged overlapping with the third diffraction structure part 26*a* of the second expansion part 26, the image light traveling between the first diffraction structure part 25*a* and the second diffraction structure part 25*b* toward the user can be compensated.

Second Embodiment

Figure 11:
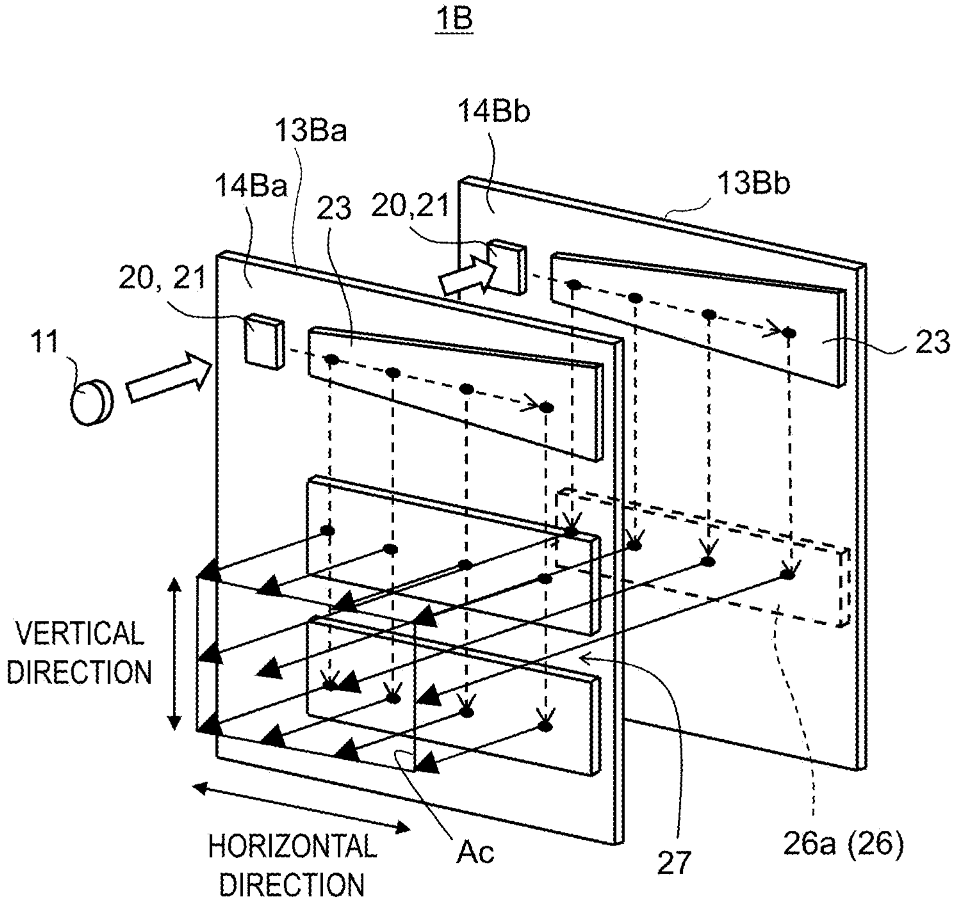
FIG. 11 is a schematic perspective view showing the configuration of an optical system of a second embodiment.
Figure 12:
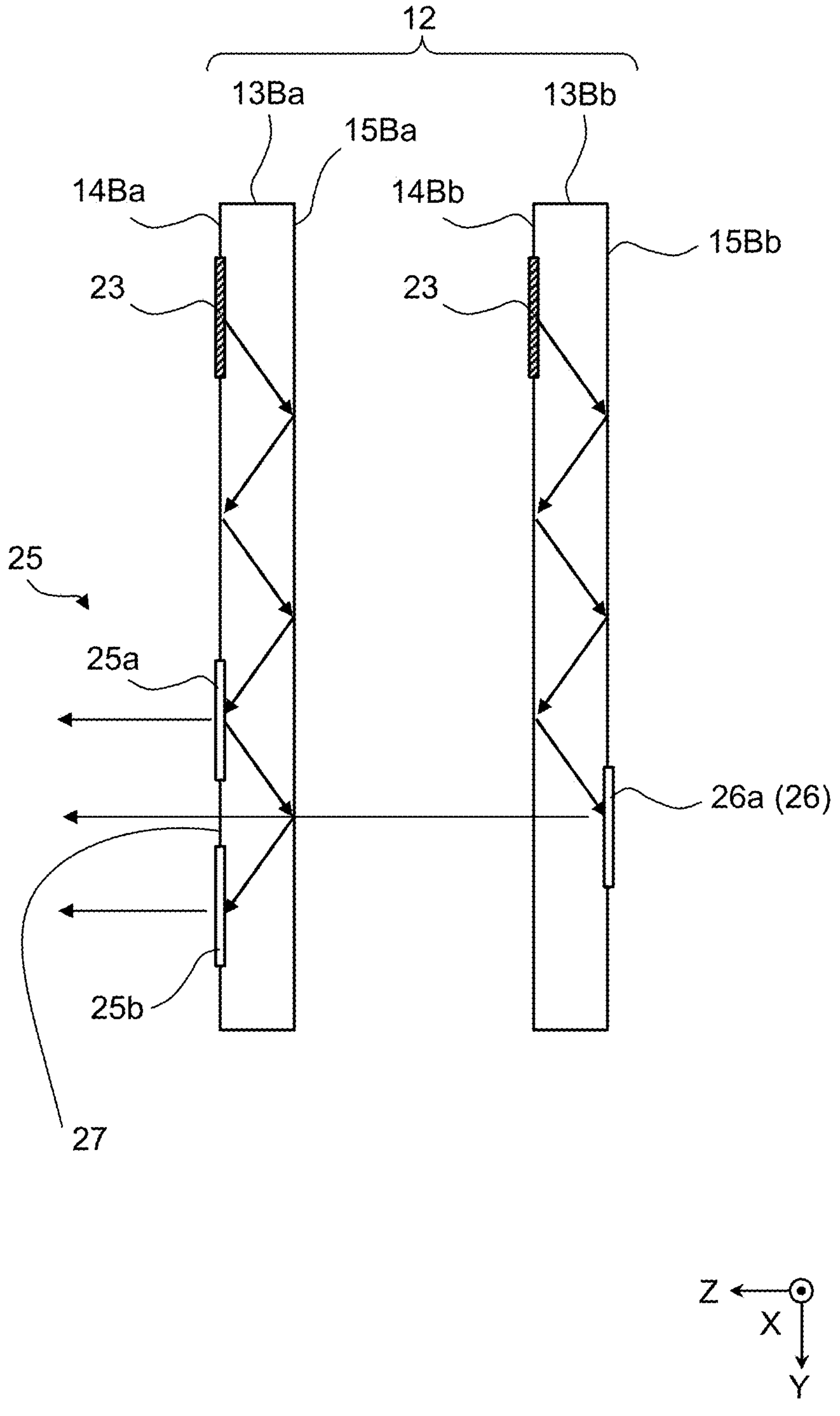
FIG. 12 is a longitudinal cross-sectional view of light guides of the second embodiment.

Referring then to FIGS. 11 and 12, an image display device 1B of a second embodiment will be described. In the first embodiment, the first expansion part 25 and the second expansion part 26 are arranged on the same light guide 13, but in the second embodiment, they are arranged on different light guides 13. Except for this point and points described below, the image display device 1 of the first embodiment and the image display device 1B of the second embodiment have the same configuration.

The image display device 1B of the second embodiment includes the display part 11 and a light guide group 12. The light guide group 12 includes a light guide 13Ba and a light guide 13Bb. The first expansion part 25 is disposed on a first main surface 14Ba of the light guide 13Ba, and the second expansion part 26 is disposed on a second main surface 15Bb of the light guide 13Bb. A part of the luminous flux L1 incident on the incidence part 20 of the light guide 13Ba passes through the incidence part 20 and enters the incidence part 20 of the light guide 13Bb, with a part of the luminous flux L1 being diffracted and propagating through the light guide 13Bb. A part of the luminous flux L1 incident on the incidence part 20 of the light guide 13Ba is diffracted and propagates through the light guide 13Ba. The luminous flux L1 incident on the incidence part 20 of the light guide 13Bb is diffracted to the third expansion part 23 of the light guide 13Bb and further diffracted to the second expansion part 26. Note that the incidence part 20 and the coupling part 21, and the third expansion part 23 may be arranged with left and right reversed.

The third diffraction structure part 26*a* of the second expansion part 26 of the light guide 13Bb is disposed overlapping with the non-diffraction structure part 27 of the first expansion part 25 of the light guide 13Ba from the user's viewpoint. Therefore, similarly to the first embodiment, the image light traveling between the first diffraction structure part 25*a* and the second diffraction structure part 25*b* toward the user can be compensated.

Other Embodiments

As described above, the above embodiments have been described as examples of the technology disclosed in this application. However, the technology in this disclosure is not limited thereto and is applicable to embodiments in which modifications, permutations, additions, omissions, etc. are made as appropriate. Thus, other embodiments will be described hereinbelow.

Figure 13:
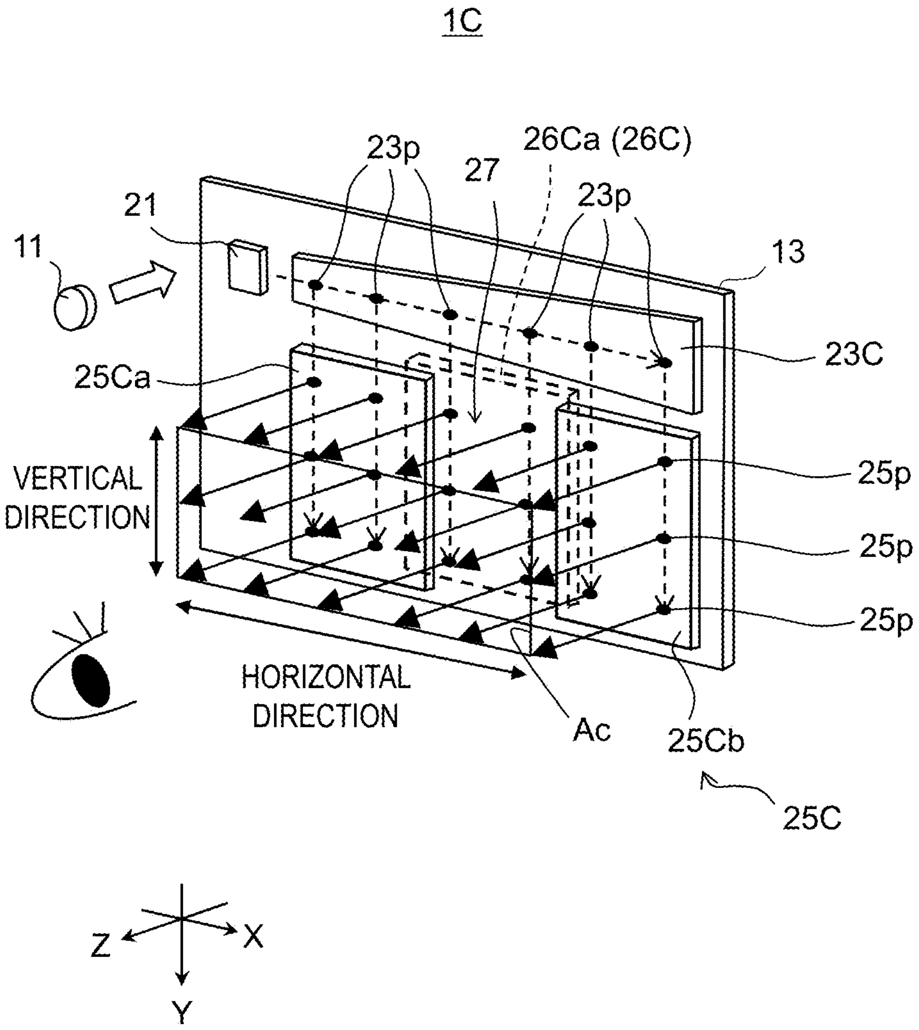
FIG. 13 is a schematic perspective view showing the configuration of an optical system in a variant of the embodiments.

In the above embodiments, the diffraction structure part is divided and arranged in the first direction, but this is not limitative. As shown in FIG. 13, the diffraction structure part may be divided and arranged in the second direction.

Figure 14:
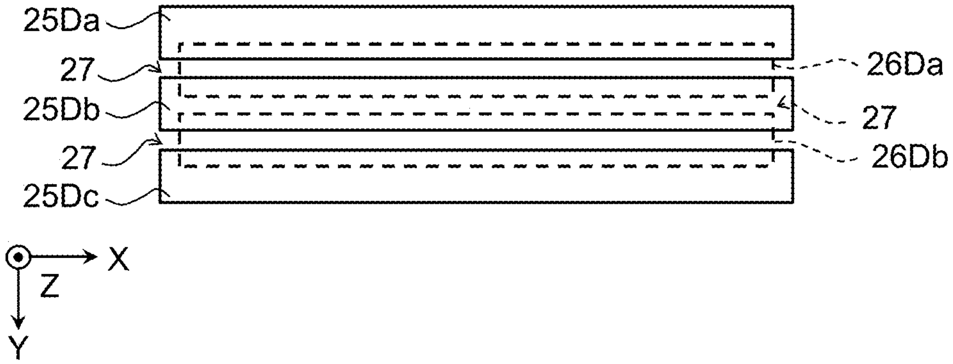
FIG. 14 is an explanatory view showing the configuration of diffraction structure parts in a variant of the embodiments.

The arrangement pattern and overlap pattern of each diffraction structure part can be modified in various manners. As shown in FIG. 14, diffraction structure parts 25Da, 25Db, and 25Dc of the first expansion part are arranged along the first direction with the non-diffraction structure parts 27 sandwiched therebetween. Diffraction structure parts 26Da and 26Db of the second expansion part may be arranged along the first direction so as to overlap with the non-diffraction structure parts 27, respectively. The non-diffraction structure parts 27 are arranged in a direction perpendicular to the propagation direction of the image light.

Figure 15:
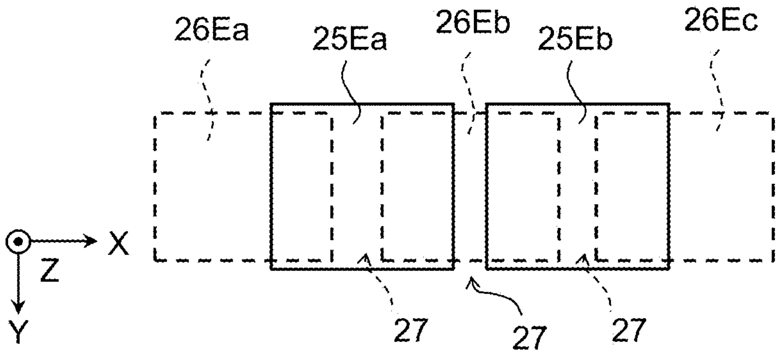
FIG. 15 is an explanatory view showing the configuration of diffraction structure parts in a variant of the embodiments.

As shown in FIG. 15, diffraction structure parts 25Ea and 25Eb of the first expansion part may be arranged along the second direction with the non-diffraction structure parts 27 sandwiched therebetween, while diffraction structure parts 26Ea, 26Eb, and 26Ec of the second expansion part may be arranged along the second direction. The diffraction structure part 26Eb of the second expansion part is disposed overlapping with the non-diffraction structure part 27. The non-diffraction structure parts 27 are arranged in a direction parallel to the propagation direction of the image light.

Figure 16:
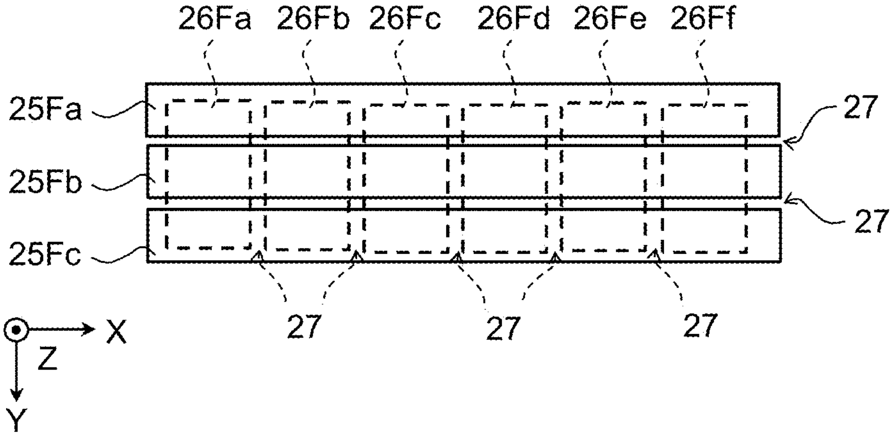
FIG. 16 is an explanatory view showing the configuration of diffraction structure parts in a variant of the embodiments.

As shown in FIG. 16, diffraction structure parts 25Fa, 25Fb, and 25Fc of the first expansion may be arranged along the first direction with the non-diffraction structure parts 27 sandwiched therebetween, while diffraction structure parts 26Fa, 26Fb, 26Fc, 26Fd, 26Fe, and 26Ff of the second expansion may be arranged along the second direction. The diffraction structure parts 26Fa to 26Ff of the second expansion are arranged overlapping with a part of each non-diffraction structure part 27. The non-diffraction structure parts 27 arranged on the first main surface 14 and the non-diffraction structure parts 27 arranged on the second main surface 15 extend in different directions.

Figure 17:
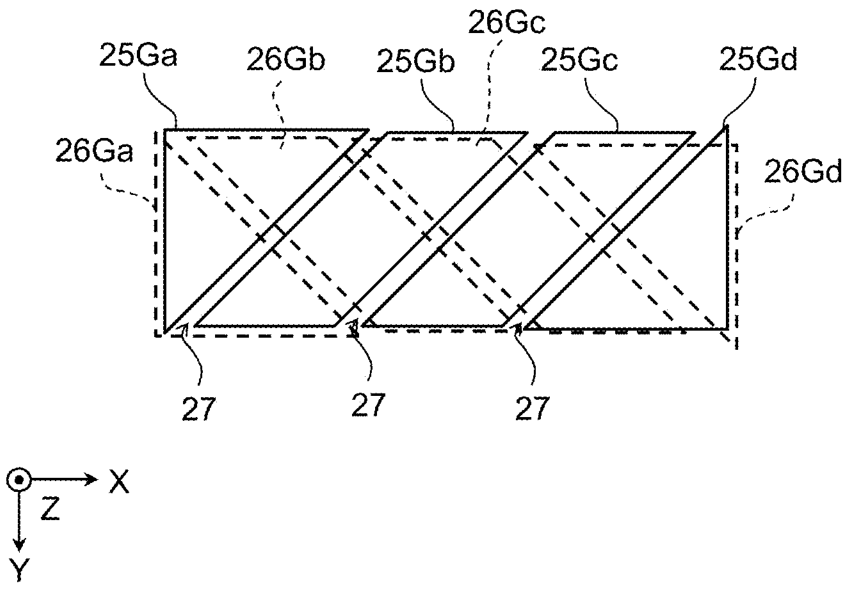
FIG. 17 is an explanatory view showing the configuration of diffraction structure parts in a variant of the embodiments.

As shown in FIG. 17, the diffraction structure parts of the first expansion part and the diffraction structure parts of the second expansion part are not limited to a rectangle, but may be a triangle, other quadrangle, or polygon. For example, diffraction structure parts 25Ga and 26Gd of the first expansion part are triangles, and diffraction structure parts 25Gb and 25Gc of the first expansion part are parallelograms. The non-diffraction structure parts 27 are each arranged between the oblique sides of the diffraction structure parts. The diffraction structure parts 26Ga to 26Gd of the second expansion part are arranged overlapping with a part of each non-diffraction structure part 27. For example, the diffraction structure parts 26Ga and 26Gd of the second expansion part are triangles, and the diffraction structure parts 26Gb and 26Gc of the second expansion part are parallelograms.

In the above embodiment, one expansion part is formed by the plurality of diffraction structure parts of the first expansion part 25 and the second expansion part 26, but this is not limitative. In the third expansion part 23, one expansion part may be formed by a plurality of diffraction structure parts divided into regions.

Overview of Embodiments (1) An optical system of the present disclosure includes: an incidence part on which image light is incident from a display part and which changes a traveling direction of the incident image light; and an expansion part that divides and duplicates the image light traveling from the incidence part. The expansion part includes: a first expansion part disposed on a first surface; and a second expansion part disposed on a second surface different from the first surface. The first expansion part includes: a first diffraction structure part and a second diffraction structure part each having a diffraction structure that divides and duplicates the image light along a first direction; and a non-diffraction structure part disposed between the first diffraction structure part and the second diffraction structure part, the non-diffraction structure part not having the diffraction structure. The second expansion part includes a third diffraction structure part that divides and duplicates image light along the first direction. The third diffraction structure part is disposed overlapping with the non-diffraction structure part of the first expansion part in a vertical direction with respect to the pupil expansion part.

Since the non-diffraction structure part disposed between the first diffraction structure part and the second diffraction structure part is disposed overlapping with the the second expansion part, it is possible to compensate for the image light traveling between the first diffraction structure part and the second diffraction structure part toward the user. The expansion part can thus be increased in size.

(2) In the optical system of (1), the optical system includes a light guide that guides, as an image, image light output from the display part to a user's field-of-view region, the light guide including the incidence part, the pupil expansion part, the first surface, and the second surface, the first surface and the second surface confronting each other.

(3) The optical system of (1) includes a first light guide and a second light guide that guide, as an image, image light output from the display part to a user's field-of-view region, the first light guide including the incidence part and the first expansion part, the second light guide including the incidence part and the second expansion part.

(4) In the optical system of any one of (1) to (3), the length of the non-diffraction structure part in a direction perpendicular to the first direction is 20 times or more the wavelength of the image light.

(5) In the optical system of any one of (1) to (4), a wavelength λ of the image light, a wavelength width Δλ of the image light, and a length Lg of the non-diffraction structure part in a direction perpendicular to the first direction satisfy a conditional expression below.

$$(\lambda \times \lambda / \Delta\lambda) - Lg > 0$$

(6) In the optical system of (2), the relationship between a length Lg1 of overlap between the second diffraction structure part and the third diffraction structure part in the first direction, a thickness t of the light guide orthogonal to the first direction, and an incident angle θ1 of a luminous flux reflected at an end of the third diffraction structure part on the first direction side to an end of the second diffraction structure part opposite to the first direction satisfies a conditional expression below.

$$Lg1 > t \times \tan\theta 1$$

(7) In the optical system of (2), the relationship between a length Lg2 of overlap between the first diffraction structure part and the third diffraction structure part in the first direction, a thickness t of the light guide orthogonal to the first direction, and an incident angle θ2 of a luminous flux reflected at an end of the third diffraction structure part opposite to the first direction to an end of the first diffraction structure part on the first direction side satisfies a conditional expression below.

$$Lg2 > t \times \tan\theta 2$$

(8) In the optical system of any one of (1) to (7), at least a part of the diffraction structure constituting the pupil expansion part has a diffraction efficiency that decreases toward the non-diffraction structure part.

(9) In the optical system of (1), the first, the second, and the third diffraction structure parts each have a plurality of diffractive gratings, wherein in at least two of the first, the second, and the third diffraction structure parts, the heights of the respective diffraction gratings are different from each other.

(10) In the optical system of (9), the height of the diffraction grating of the second diffraction structure part is greater than the height of the diffraction grating of the third diffraction structure part, and the height of the diffraction grating of the third diffraction structure part is greater than the height of the diffraction grating of the first diffraction structure part. Image light propagates through the first diffraction structure part, the third diffraction structure part, and the second diffraction structure part in the mentioned order, and image light is extracted by each of the diffraction structure parts. At that time, the height of the diffraction structure in each diffraction structure part is proportional to the amount of light extracted. Thus, since the remaining amount of light decreases each time image light is extracted, the height of the diffraction structure is increased to increase the amount of light extracted, so that uniform light can be extracted from the entire field-of-view region.

(11) In the optical system of (1), in at least two of the first, the second, and the third diffraction structure parts, the slant angles of the respective diffraction gratings are different from each other.

(12) In the optical system of (1), the slant angle of the diffraction grating of the first diffraction structure part is greater than the slant angle of the diffraction grating of the second diffraction structure part. This allows the angle to be closer to the propagation light in the first diffraction structure part and deeper to the propagation light in the second diffraction structure part, thus strengthening the efficiency of the light when viewed from above and below the field-of-view region.

(13) In the optical system of (11), the slant angles of the first and second diffraction structure parts are shaped such that the direction in which propagation light enters is different from the slant angle of the third diffraction structure part and such that the direction in which the image light exits is the same as the slant angle of the third diffraction structure part. As a result, the first and second diffraction structure parts serve as transmission-type diffraction gratings that extract image light to the user side, while the third diffraction structure part serves as a reflection-side diffraction grating that extracts an image to the user side, making it possible to extract uniform image light with no defects.

(14) In the optical system of any one of (1) to (13), the first diffraction structure part and the second diffraction structure part of the first expansion part and the third diffraction structure part of the second expansion part are in relief shape.

(15) In the optical system of any one of (1) to (14), the pupil expansion part includes a third expansion part that divides and duplicates the image light traveling from the incidence part into image light traveling in a second direction intersecting the first direction and image light traveling in the first direction, wherein the first expansion part and the second expansion part are disposed in the first direction with respect to the third expansion part, and wherein the light guide includes an emission part through which image light further divided and duplicated along the first direction by the first expansion part and the second expansion part is emitted from the pupil expansion part.

(16) In the optical system of any one of (1) to (15), the non-diffraction structure part is disposed in a direction perpendicular to the direction of propagation of the image light.

(17) In the optical system of any one of (1) to (15), the non-diffraction structure part is disposed in a direction parallel to the direction of propagation of the image light.

(18) In the optical system of any one of (1) to (15), the non-diffraction structure part arranged on the first main surface and the non-diffraction structure part arranged on the second main surface extend in different directions.

(19) An image display device of the present disclosure includes: the optical system of any one of (1) to (18); and a display part that emits the image light.

The present disclosure is applicable to an optical system and an image display device that divide and duplicate an image.

EXPLANATIONS OF LETTERS OR NUMERALS

1, 1B image display device
11 display part
12 light guide group
13, 13Ba, 13Bb light guide
14 first main surface
15 second main surface
20 incidence part
21 coupling part
22 pupil expansion part
23 third expansion part
25, 25A first expansion part
25*a* first diffraction structure part
25*b* second diffraction structure part
25*p* point
26 second expansion part
26*a* third diffraction structure part
27 non-diffraction structure part
29 emission part
31*a* diffraction grating
Ac field-of-view region
D observer
Iv image
L1, L2, L3, L4 luminous flux

What is claimed is:

1. An optical system comprising:
an incidence part on which image light is incident from a display part, the incidence part changing a traveling direction of the incident image light; and
a pupil expansion part that divides and duplicates the image light traveling from the incidence part,
the pupil expansion part including:
a first expansion part disposed on a first surface; and
a second expansion part disposed on a second surface different from the first surface,
the first expansion part including:
a first diffraction structure part and a second diffraction structure part each having a diffraction structure that divides and duplicates the image light along a first direction; and
a non-diffraction structure part disposed between the first diffraction structure part and the second diffraction structure part, the non-diffraction structure part not having the diffraction structure,
the second expansion part including:
a third diffraction structure part that divides and duplicates the image light along the first direction,
the third diffraction structure part being disposed to overlap with the non-diffraction structure part of the first expansion part in a vertical direction with respect to the pupil expansion part.

2. The optical system according to claim 1, wherein
the optical system comprises a light guide that guides, as an image, image light output from the display part to a user's field-of-view region, wherein
the light guide includes the incidence part, the pupil expansion part, the first surface, and the second surface,
the first surface and the second surface confronting each other.

3. The optical system according to claim 1, comprising:
a first light guide and a second light guide that guide, as an image, image light output from the display part to a user's field-of-view region, wherein
the first light guide includes the incidence part and the first expansion part, and
the second light guide includes the incidence part and the second expansion part.

4. The optical system according to claim 1, wherein
the length of the non-diffraction structure part in a direction perpendicular to the first direction is 20 times or more the wavelength of the image light.

5. The optical system according to claim 1, wherein
a wavelength λ of the image light, a wavelength width Δλ of the image light, and a length Lg of the non-diffraction structure part in a direction perpendicular to the first direction satisfy a following conditional expression, $$(\lambda \times \lambda / \Delta\lambda) - Lg > 0.$$

6. The optical system according to claim 2, wherein
the relationship between a length Lg1 of overlap between the second diffraction structure part and the third diffraction structure part in the first direction, a thickness t of the light guide orthogonal to the first direction, and an incident angle θ1 of a luminous flux reflected at an end of the third diffraction structure part on the first direction side to an end of the second diffraction structure part opposite to the first direction satisfies a following conditional expression, $$Lg1 > t \times \tan\theta 1.$$

7. The optical system according to claim 2, wherein
the relationship between a length Lg2 of overlap between the first diffraction structure part and the third diffraction structure part in the first direction, a thickness t of the light guide orthogonal to the first direction, and an incident angle θ2 of a luminous flux reflected at an end of the third diffraction structure part opposite to the first direction to an end of the first diffraction structure part on the first direction side satisfies a following conditional expression, $$Lg2 > t \times \tan\theta 2.$$

8. The optical system according to claim 1, wherein
at least a part of the diffraction structure constituting the pupil expansion part has a diffraction efficiency that decreases toward the non-diffraction structure part.

9. The optical system according to claim 1, wherein
the first, the second, and the third diffraction structure parts each have a plurality of diffractive gratings, and wherein
in at least two of the first, the second, and the third diffraction structure parts, the heights of the respective diffraction gratings are different from each other.

10. The optical system according to claim 9, wherein the height of the diffraction grating of the second diffraction structure part is greater than the height of the diffraction grating of the third diffraction structure part, and wherein the height of the diffraction grating of the third diffraction structure part is greater than the height of the diffraction grating of the first diffraction structure part.

11. The optical system according to claim 1, wherein in at least two of the first, the second, and the third diffraction structure parts, the slant angles of the respective diffraction gratings are different from each other.

12. The optical system according to claim 11, wherein the slant angle of the diffraction grating of the first diffraction structure part is greater than the slant angle of the diffraction grating of the second diffraction structure part.

13. The optical system according to claim 11, wherein the slant angles of the first and second diffraction structure parts are shaped such that the direction in which propagation light enters is different from the slant angle of the third diffraction structure part and such that the direction in which the image light exits is the same as the slant angle of the third diffraction structure part.

14. The optical system according to claim 1, wherein the first diffraction structure part and the second diffraction structure part of the first expansion part and the third diffraction structure part of the second expansion part are in relief shape.

15. The optical system according to claim 2, wherein the pupil expansion part includes a third expansion part that divides and duplicates the image light traveling from the incidence part into image light traveling in a second direction intersecting the first direction and image light traveling in the first direction, wherein the first expansion part and the second expansion part are disposed in the first direction with respect to the third expansion part, and wherein the light guide includes an emission part through which image light further divided and duplicated along the first direction by the first expansion part and the second expansion part is emitted from the pupil expansion part.

16. The optical system according to claim 1, wherein the non-diffraction structure part is disposed in a direction perpendicular to the direction of propagation of the image light.

17. The optical system according to claim 1, wherein the non-diffraction structure part is disposed in a direction parallel to the direction of propagation of the image light.

18. The optical system according to claim 1, wherein the longitudinal directions of the non-diffraction structure part disposed on the first surface and the non-diffraction structure part disposed on the second surface are different from each other.

19. An image display device comprising:

the optical system according to claim 1; and a display part that emits the image light.

* * * * *